(12) United States Patent
Minoura et al.

(10) Patent No.: US 6,323,883 B1
(45) Date of Patent: Nov. 27, 2001

(54) METHOD AND APPARATUS OF DISPLAYING A CALENDAR

(75) Inventors: Tadaaki Minoura, Sagamihara; Shichiro Miyashita, Yamato; Toru Tachibana, Yokohama, all of (JP)

(73) Assignee: International Business Machines Corp., Armonk, NY (US)

( * ) Notice: Subject to any disclaimer, the term of this patent is extended or adjusted under 35 U.S.C. 154(b) by 668 days.

(21) Appl. No.: 08/704,186

(22) Filed: Aug. 28, 1996

(30) Foreign Application Priority Data

Aug. 28, 1995 (JP) .................................... 7-219163

(51) Int. Cl.⁷ ....................................................... G09G 5/00
(52) U.S. Cl. ........................... 345/784; 345/777; 708/112
(58) Field of Search .................................... 345/340, 341, 345/342, 348, 349, 777, 784, 802, 829, 830; 702/178; 705/9; 707/525; 708/112

(56) References Cited

U.S. PATENT DOCUMENTS

| | | | |
|---|---|---|---|
| 5,247,438 | * | 9/1993 | Subas et al. ........................... 364/400 |
| 5,379,153 | * | 1/1995 | Ishii et al. .............................. 360/27 |
| 5,544,288 | * | 8/1996 | Morgan et al. ....................... 345/340 |
| 5,649,188 | * | 7/1997 | Nomura et al. ...................... 395/611 |

* cited by examiner

Primary Examiner—Ba Huynh
(74) Attorney, Agent, or Firm—A. Bruce Clay

(57) ABSTRACT

The present invention provides a scheduler that is able to display two weeks of a last or a next month with the current month with legible fonts. When a zoom key is input by an operator, a monthly calendar is displayed with another week. If a particular date of the month is an early date of the month, one week of the last month is additionally displayed. If a particular date of the month is a late date of the month, one week of the next month is additionally displayed. When a centering key is input by an operator, five weeks are displayed so that a week with a particular date is displayed in the middle of the five weeks.

10 Claims, 10 Drawing Sheets

FIG 2

Six-month calendar      01/14/95 12:40

January 1995

| SUN | MON | TUE | WED | THU | FRI | SAT |
|---|---|---|---|---|---|---|
| 1 | 2 | 3 | 4 | 5 | 6 | 7 |
| 8 | 9 | 10 | 11 | 12 | 13 | (14) |
| 15 | 16 | 17 | [18] | 19 | 20 | 21 |
| 22 | 23 | 24 | 25 | 26 | 27 | 28 |
| 29 | 30 | 31 | | | | |

February 1995

| SUN | MON | TUE | WED | THU | FRI | SAT |
|---|---|---|---|---|---|---|
| | | | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | | | | |

March 1995

| SUN | MON | TUE | WED | THU | FRI | SAT |
|---|---|---|---|---|---|---|
| | | | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 | |

April 1995

| SUN | MON | TUE | WED | THU | FRI | SAT |
|---|---|---|---|---|---|---|
| | | | | | | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | | | | | | |

May 1995

| SUN | MON | TUE | WED | THU | FRI | SAT |
|---|---|---|---|---|---|---|
| | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | | | |

June 1995

| SUN | MON | TUE | WED | THU | FRI | SAT |
|---|---|---|---|---|---|---|
| | | | | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | |

[help]    [previous month]   [next month]    [month]   [week]

18

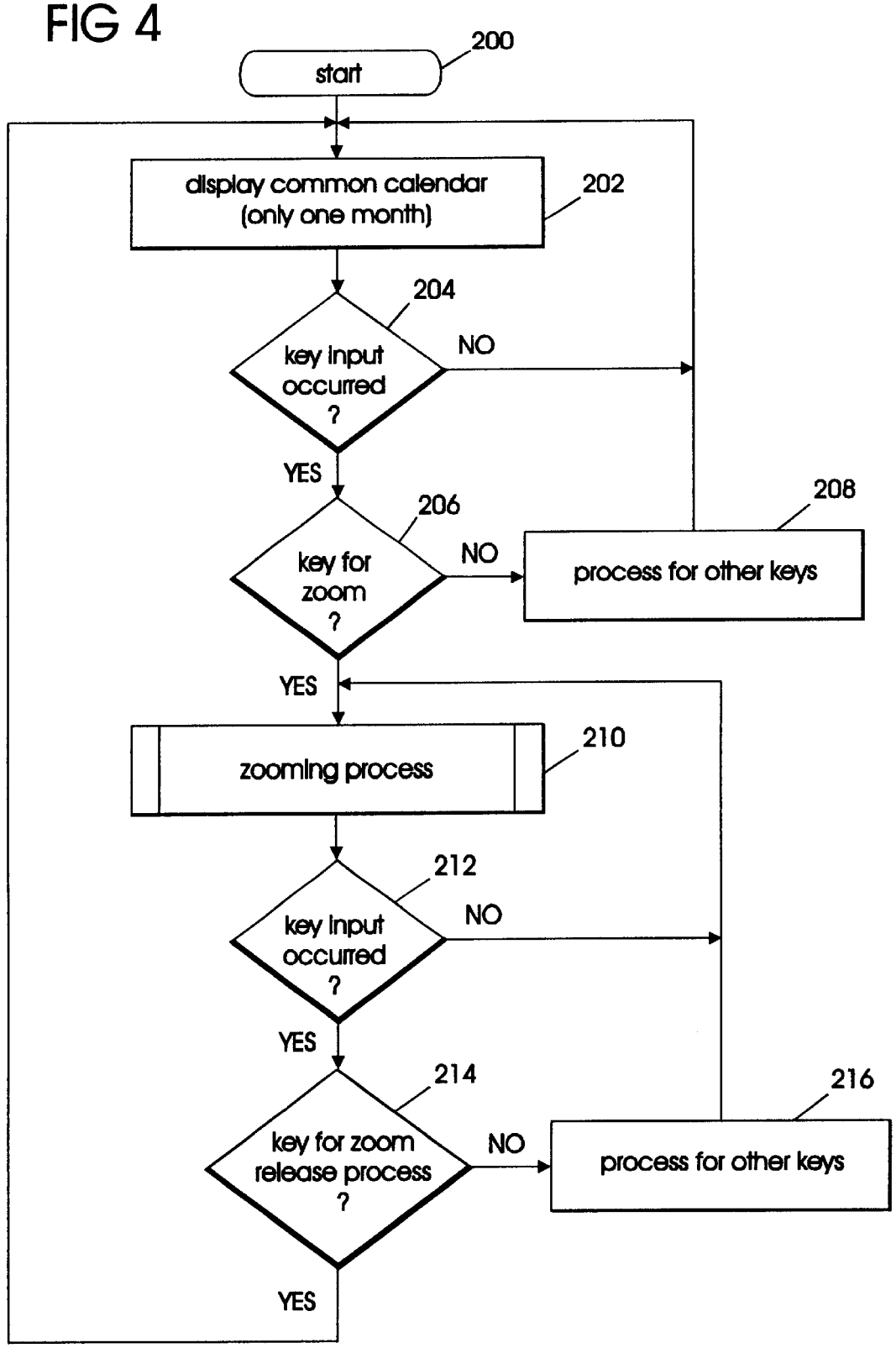

METHOD AND APPARATUS OF DISPLAYING A CALENDAR

FIELD OF THE INVENTION

The present invention relates to a calendar display method and a calendar display apparatus; and more specifically, to a calendar display method and apparatus by which a schedule that extends from an immediately preceding month or into an immediately succeeding month is displayed so as to be easily seen.

BACKGROUND OF THE INVENTION

As is described in "Microsoft Windows Version 3.1 Operating System Function Guide 1993, by Microsoft, pp. 566 to 584("Microsoft" and "Windows" are trademarks of Microsoft Corp.)" and in "PROFS, Basic course, second edition, October 1987, by IBM Japan, Ltd., Chapter 4 Schedule management, p.4-1 to 4-28 ("PROFS" and "IBM Japan" are trademarks of IBM Corp.)", most conventional application programs that are called schedulers display scheduling periods of days, weeks and months. A common four to six week calendar display is shown in FIG. 1.

With this method, however, a schedule for only a current month is displayed, and a 2-week schedule that extends from an immediately preceding month or into an immediately succeeding month cannot be shown in a single display. Although a schedule for an immediately preceding week or for an immediately succeeding week is closely related to a current week, at the beginning or the end of a month, a user must refer to the immediately preceding or immediately succeeding calendar month to check the schedule for the past or the following week. A user cannot view a scheduled event that extends between months which is very inconvenient.

Japanese Examined Patent Publication No. 7(1995)-19268 discloses a calendar with which a user can refer to the schedules for months, days and weeks, and for dates, but this cannot resolve the above shortcoming.

As is described in "HP 200LX User's Guide Edition 2, August 1994, by Hewlett Packard, p.3-10 to 3-11("Hewlett Packard" is a trademark of Hewlett Packard Corp.)", a calendar for a six month period is displayed at one time, so that a schedule event that extends between months can be viewed at a glance. With such a display method, however, monthly calendars are merely arranged in a two row by three column grid. According to this method, the display area for an individual day is reduced, and thus scheduled events for an individual day cannot be displayed. If daily data equivalent to that for the calendar of a month shown in FIG. 1 is to be shown, a calendar must be displayed with one sixth of the font size or lower. This is a very serious problem to overcome for a portable computer and for an electronic notebook with a small screen.

To display Japanese, a font of 24×24 dots or greater is preferable. Because of the limitations imposed by display screens, it is not possible to ensure that this font size can be provided for the display shown in FIG. 2, and it may not be possible to identify Chinese characters.

It is one object of the present invention to provide a scheduler that ensures a font size can be employed that is appropriate for user viewing, even on an insufficiently large display screen, and that can display a two-week schedule that extends from an immediately preceding month or into an immediately succeeding month. It is another object of the present invention to display a calendar for a period that a user desires.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 2 is a diagram illustrating a conventional display screen on which a six-month calendar is displayed;

FIG. 3 is a block diagram illustrating a data processing system that serves as one part of an apparatus according to the present invention and that is employed for carrying out a method according to the present invention;

FIG. 4 is a flowchart for a zooming process according to a preferred embodiment of the present invention;

SUMMARY OF THE INVENTION

Figure 1:
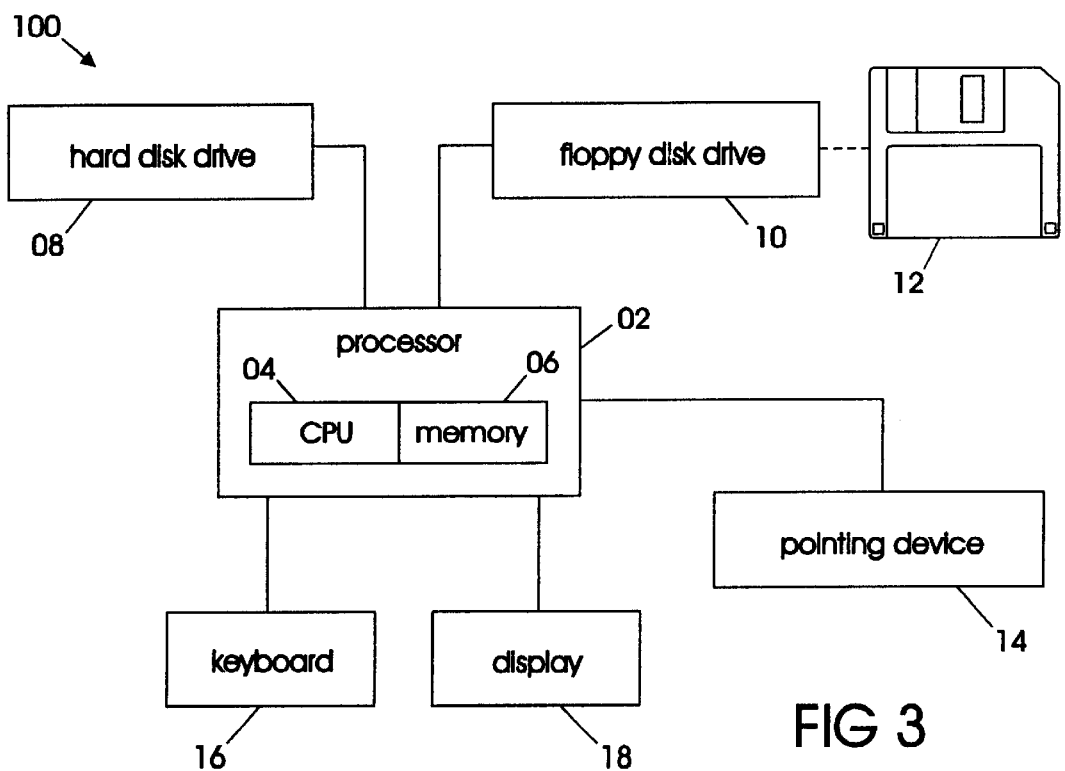
FIG. 1 is a diagram illustrating a conventional display screen on which a monthly calendar is displayed.

To achieve these objects, according to one aspect of the present invention, a calendar display method for displaying various daily data on a display screen comprises: a step of calling up a calendar for a specific month and for displaying days of the calendar on the display screen of one week per row; a step of detecting an input for zooming; and a step of, when the input for zooming is detected, additionally displaying at least one more week, which is closer to a specific day, following a currently displayed calendar.

According to another aspect of the present invention, a calendar display apparatus, which displays various daily data on a display screen, comprises: a portable housing wherein an LCD device, an input device, a memory and a CPU are incorporated; means for calling up a calendar for a specific month and for displaying days of the calendar on the display screen with one week per row; means for detecting an input for zooming; and means for, when the input for zooming is detected, additionally displaying at least one more week, which is closer to a specific day, following a currently displayed calendar.

According to an additional aspect of the present invention, a calendar display method for displaying various daily data on a display screen, comprises: a step of calling up a calendar for a specific month and for displaying days of the specific month on the display screen with one week per row; a step of detecting an input for centering; and a step of, when the input for centering is detected, displaying five weeks with a week, to which a specific day belongs, being located in the middle.

According to a further aspect of the present invention, a calendar display apparatus, for displaying various daily data on a display screen, comprising: a display device; an input device; means for calling up a calendar for a specific month and for displaying days of the specific month on the display screen with one week per row; means for detecting an input for centering; and means for, when the input for centering is detected, displaying five weeks with a week, to which a specific day belongs, being located in the middle.

According to a still further aspect of the present invention, an apparatus, for displaying a daily calendar on a display screen, comprising: an input device; a display device; means for calling up a calendar for a specific month and for displaying the daily calendar with each of at least four weeks of the specific month constituting one row; and means for additionally displaying, in response to an input for display alteration, at least one more week that follows a currently displayed calendar to continuously display the additional week and the daily calendar on the display screen.

According to still another aspect of the present invention, a method, for displaying a daily calendar on a display screen, comprising: a step of calling up a calendar for a specific month and of displaying the daily calendar with each of at least four weeks of the specific calendar constituting one row; and a step of, in response to the input for display alteration, adding at least one week that follows a currently displayed calendar to continuously display the one week and the daily calendar on the display screen.

A method of the present invention can further comprise a step of detecting an input for releasing an altered display; and a step of, when the input for releasing an altered display is detected, returning to a display that exits before the input is entered.

According to the method of the present invention, an original calendar display area on the screen and a calendar display area can be set after a display alteration such that they are the same size, and the same size display area can be allocated to the weeks of a calendar that is displayed following the display alteration.

According to the method of the present invention, a font size for displayed daily data on a calendar, which is displayed following the display alteration, can be changed in consonance with the font size of data that is to be displayed for each day in an originally displayed calendar.

According to the method of the present invention, a font size for displayed daily data on a calendar, which is displayed following the display alteration, can be changed in consonance with the display area for each week on a calendar that is displayed following the display alteration. The display alteration can be repeated.

DETAILED DESCRIPTION OF THE INVENTION

FIG. 3 is a block diagram illustrating a data processing system 100 according to the present invention. The data processing system 100 includes a processor 2, which has a central processing unit (CPU) 4 and a memory 6. To the processor 2 are connected a hard disk drive 8 and a floppy disk drive 10 as auxiliary storage devices. A diskette 12 is inserted into the floppy disk drive 10. On the diskette 12 code of a computer program is recorded to carry out the present invention by employing the data processing system 100. The data processing system 100 can also serve as a system for use with user interface hardware. The user interface hardware is, for example, a pointing device 14 or a keyboard 16, which is employed to input data to the processor 2, or a display 18 that visually provides data to a user. The pointing device 14 is available as a track ball, a Track Point (Track Point is a trademark of IBM Corp.), or a joy stick, in addition to a mouse. A specific example of the data processing system 100 is a portable personal computer, an electronic notebook, or a game machine.

Figure 6:
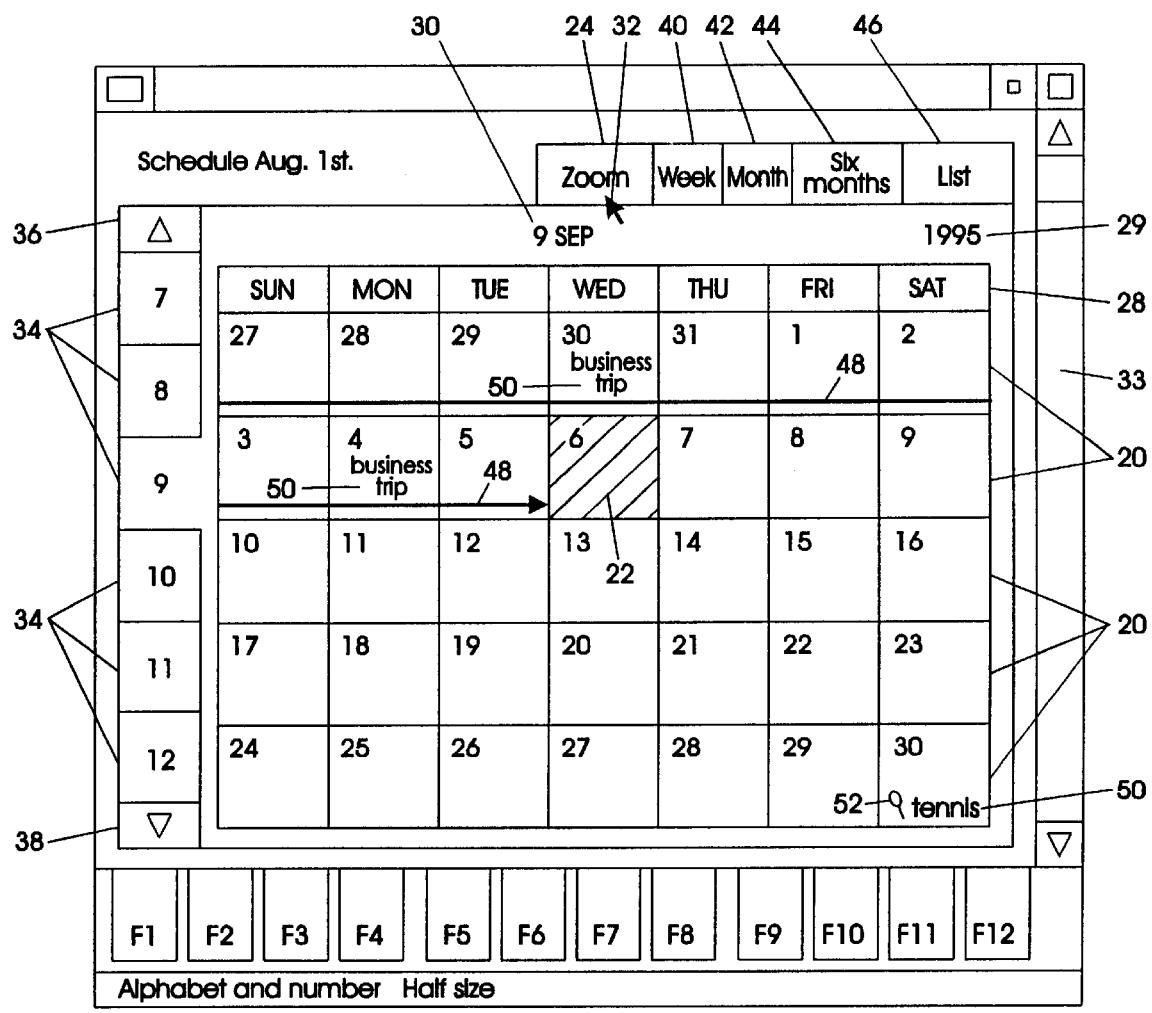
FIG. 6 is a diagram showing the calendar changes that are obtained by performing the zooming process of the present invention.

FIG. 4 is a flowchart for a calendar zooming process in accordance with the present invention. At process block 202, a common calendar for one month is displayed on a display screen 18, as is shown in FIG. 6. On this screen, five weeks, which cover all of the days in September, are displayed on a calendar display area 28. Since the number of weeks in September fluctuates depending on the days for the 28th through the 31st, 4 to 6 weeks are displayed at the beginning. Such a display can be fixed at five weeks, and when only four weeks are sufficient for a month, the first week of the following month may be added; while, when six weeks are required for a month display, the sixth week can be omitted, or the area for the first and/or the second day of the fifth week may be divided, so that the days of the six weeks may be combined.

On the display screen 18 are displayed a zoom icon 24 for selecting a zoom function, which is an example of a display alteration for this invention; a week display icon 40 for changing a display to a weekly calendar; a month display icon 42 for changing a display to a monthly calendar; a six-month display icon 44 for changing a display to a six-month calendar; and a list icon 46 for outputting a list. A ruler bar 33 is located on the right side of the display screen 18, and is employed to scroll a monthly calendar to an immediately preceding month or to an immediately succeeding month. Month selection icons 34 are positioned on the left side of the display screen 18, and can be used to select a month to be displayed. With the month selection icons 34, a month other than the currently displayed months of July through December can be selected by using month scroll icons 36 and 38. A year indicator 29 and a month indicator 30 can also be displayed with a currently displayed calendar. A plurality of daily display frames 20, and characters 50, figures 52, and lines 48 that describe a period, all of which are displayed in the display frames 20, can be included on the display screen 18. It would be obvious to one having ordinary skill in the art that the present invention is a multi-window environment.

A specific day, indicated by reference numeral 22, is not only a current date that is held by the calendar function of a computer, but may also be a desired date that a user selects by using the pointer 32. In FIGS. 6, 7, 10 and 11, the specific date 22 is displayed as a reversed image. In order to notify a user that a specific day 22 has been selected, a sound that draws the user's attention can be generated, a mark that represents the specific day 22 can be displayed, or the color or the luminance of the specific day 22 can be changed. The display method can be set by a user.

Figure 7:
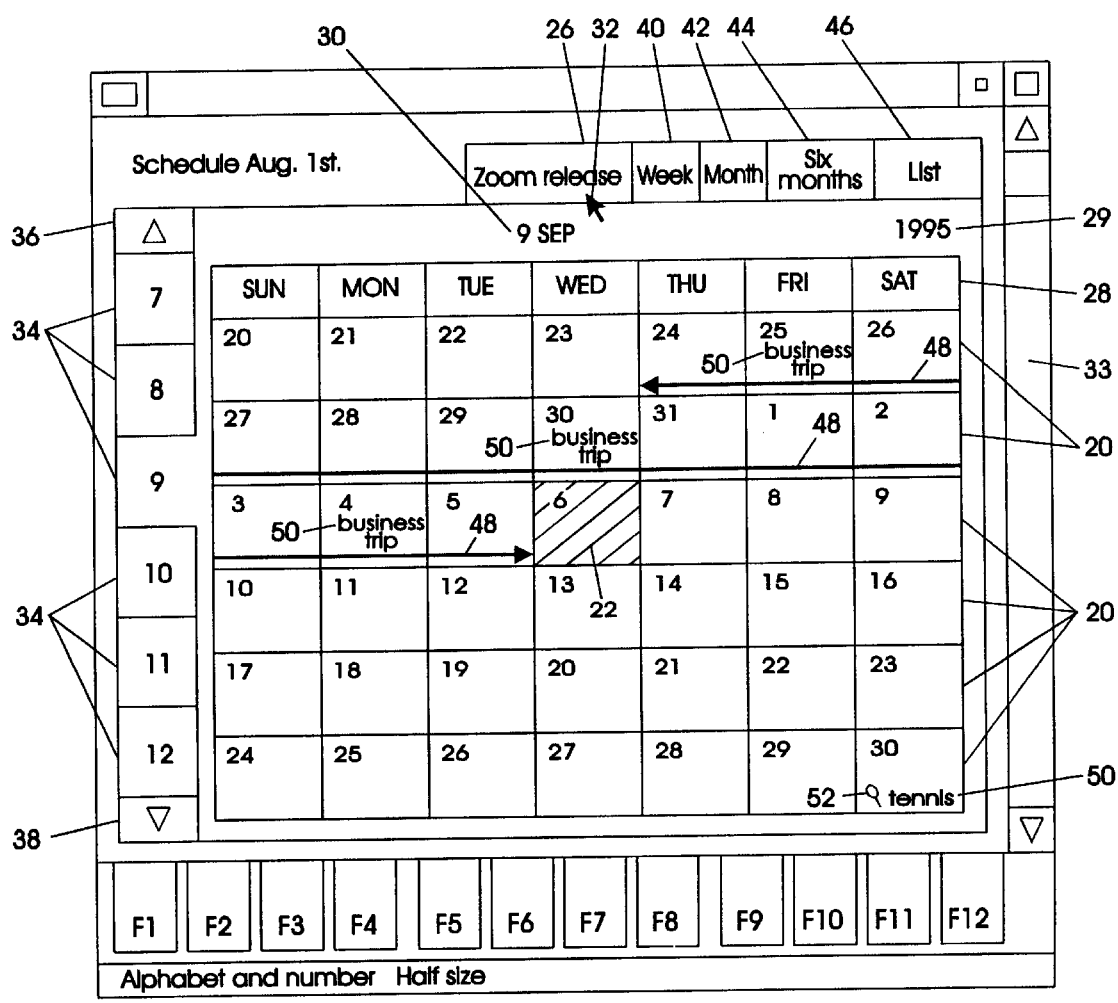
FIG. 7 is a diagram showing calendar changes that are obtained by performing the zooming release process of the present invention.

Returning to FIG. 4, program control waits until key input occurs. When, at decision block 204, key input is detected, at decision block 206, a check is performed to determine whether or not the input is for zoom. Such key input can be performed by selecting the zoom icon 24 with the pointer 32, by depressing the "Z" key on the keyboard, by depressing a designated PF key, or by selecting the daily display frame of the specific day 22 by double clicking. When the input is not for zooming, at process block 208, a process for other key input is performed. When the input is for zooming, at process block 210, the zooming process, which will be described later, is performed. On the display screen 18, six weeks, which includes daily frames 20 that belong to the week before the first week in September, are displayed, as is shown in FIG. 7. In this manner, schedules 48 and 50 that extend over parts of two months can be displayed.

In the preferred embodiment of the present invention, program control waits again for the occurrence of key input. If, at decision block 212, key input is detected, at decision block 214, a check is performed to determine whether or not the input is for zoom release. Such key input, as is the key input for zooming, can be performed by selecting the zoom release icon 26 (FIG. 7) with the pointer 32, by depressing the "K" key on the keyboard, by depressing a designated PF key, or by selecting the daily display frame 20 of the specific day 22 by double clicking. When the input is not for zoom release, at process block 216, a process for other key input is performed. When the input is for zoom release, at process block 202, a common calendar of one month, as is shown in FIG. 6, is again displayed on the display screen 18. According to another mode of the present invention, a zoom icon (not shown) is displayed in the state shown in FIG. 7, so that a zooming process can be performed. By the selection of the zoom icon 24, a display of another week is added, and a total of seven weeks can be displayed. This operation can be repeated a predetermined number of times. A font size for a character to be displayed is selected that is in consonance with the size of the daily display frame 20. For example, when a 24×24 dot font is employed to display a common monthly calendar in FIG. 6, the font to be employed after the zooming can be: 24×5 dots in a vertical direction/the number of weeks to be displayed: omitting a number at a decimal place. In FIG. 7, a 20×24 dot font or a 20×20 dot font is employed.

Figure 5:
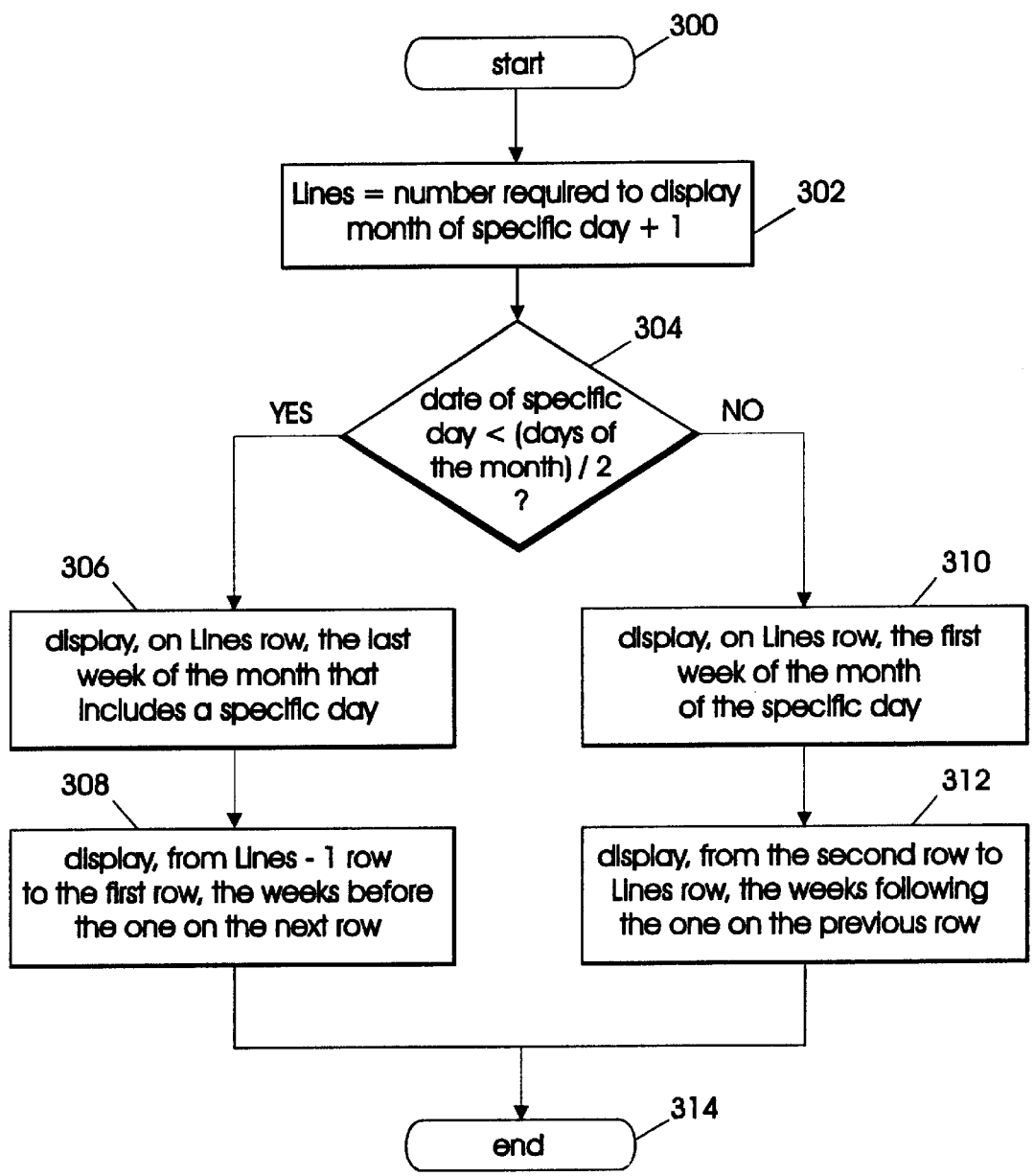
FIG. 5 is a flowchart for a zooming release process according to the preferred embodiment of the present invention.

The procedures for the zooming process will now be explained while referring to FIG. 5. For adding one week to the display that was previously described, at process block 302 "the number of rows for displaying a month to which a specific day 22 belongs +1" is set as the number of lines to be displayed. When an iterative zooming process can be performed, "the number of the currently displayed rows +1" is set. To add one week both of an immediately preceding month and of an immediately succeeding month, "the number of rows required for displaying a month that includes a specific day 22 +2" is set. To display n weeks before and after a specific day 22, "the number of rows required for displaying the month that includes a specific day 22+n+|3−x|−2" is set (it should be noted that x is the number of a row wherein a specific day 22 is displayed; a five week display case). A user can select such setup procedures by using a pull down menu.

At decision block 304, the date of the specific day 22 is compared with (the number of days in the pertinent month)/2. In consonance with the result, the week of an immediately preceding month is displayed when the specific day 22 is in the first half of the month, and the week of an immediately succeeding month is displayed if the specific day 22 is in the second half of the month. The number of a row of the week that includes the specific day 22 is compared with the number of currently displayed rows/2, so that the weeks of an immediately preceding month are displayed when the row number of the week that includes the specific day 22 is in the first part of the currently displayed rows, and so that the weeks of the next month are displayed when the row number of the week is in the latter part.

If the result at decision block 304 is Yes (the specific day 22 is in the first part of the month), at process block 306 the last week of the month that includes the specific day 22 is displayed on the row that corresponds to the displayed line number (Lines). At process block 308, the previous weeks that continue from that week are displayed from the row that corresponds to the displayed line number (Lines) −1 to the first row. When the result at decision block 304 is No (the specific day 22 is in the second half of the month), at process block 310 the first week of the month that includes the specific day 22 is displayed on the first row. At process block 312, the following weeks are displayed from the second row to the line number (Lines) row.

Figure 8:
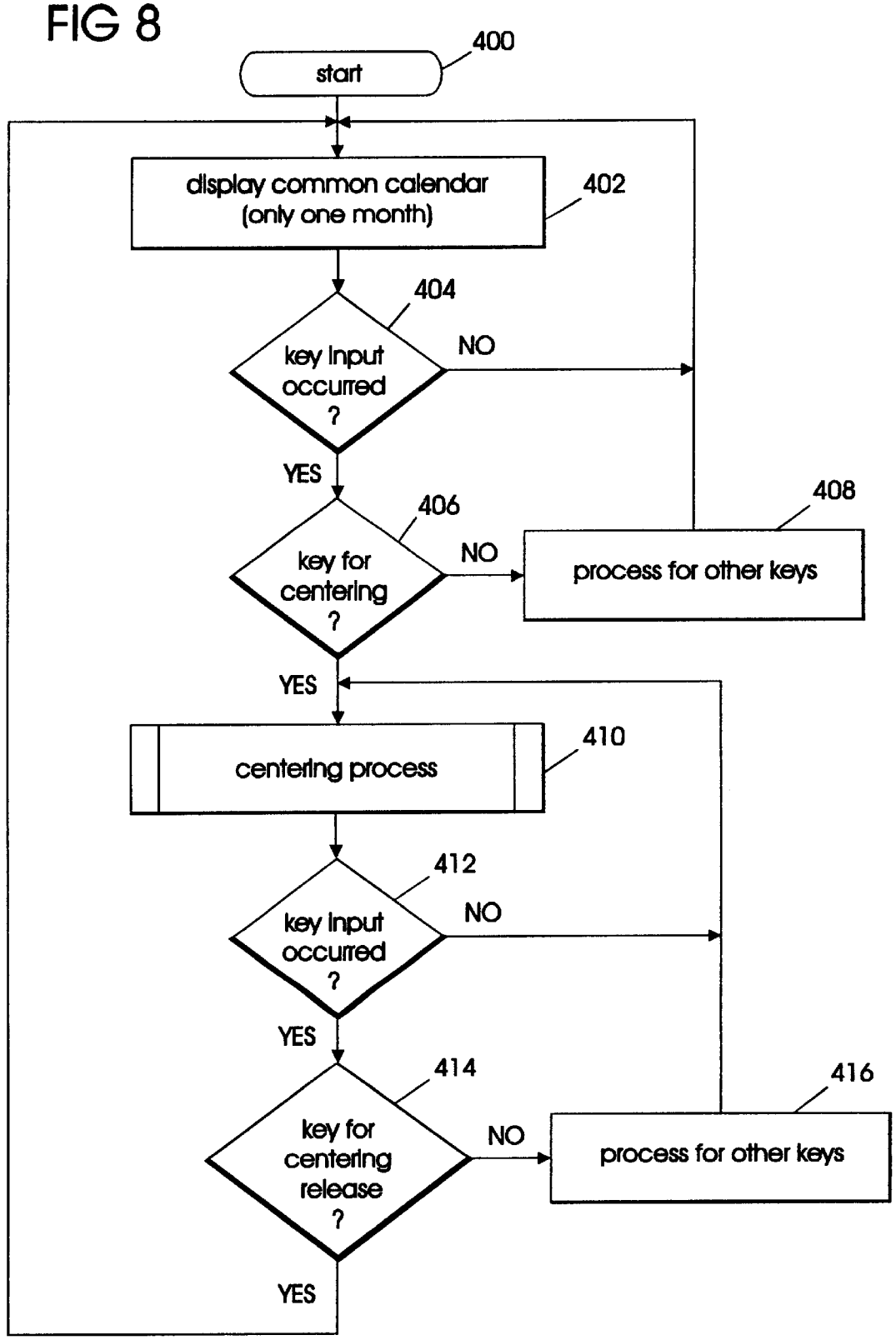
FIG. 8 is a flowchart showing a centering process according to the preferred embodiment of the present invention.
Figure 10:
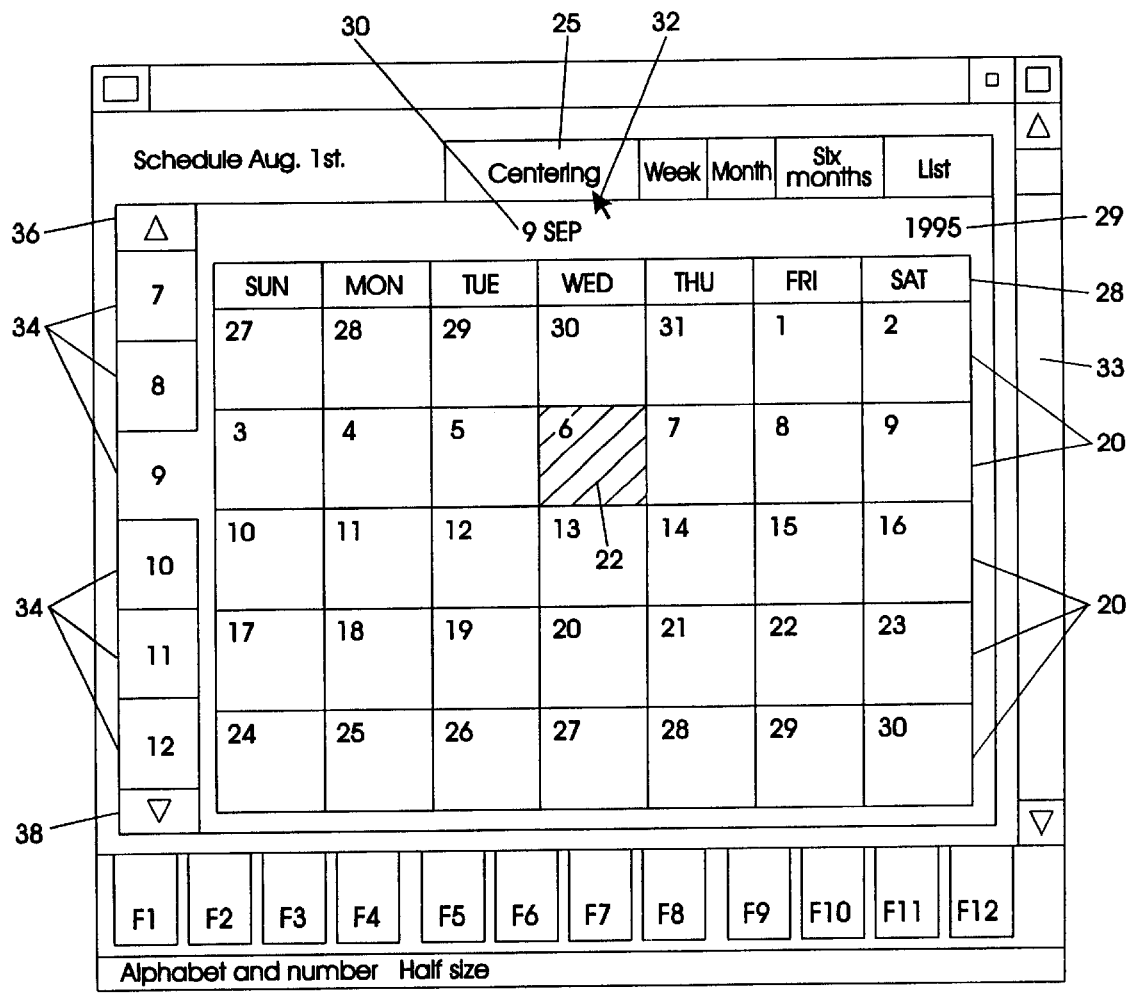
FIG. 10 is a diagram showing calendar changes that are obtained by performing the centering process of the present invention.

The calendar centering process is shown in FIG. 8. As well as the calendar zooming process, at process block 402, a common calendar for one month is displayed on the display screen 18, as is shown in FIG. 10. On the display screen 18, a centering icon 25 for selecting centering is displayed instead of the zoom icon in FIG. 6.

Figure 11:
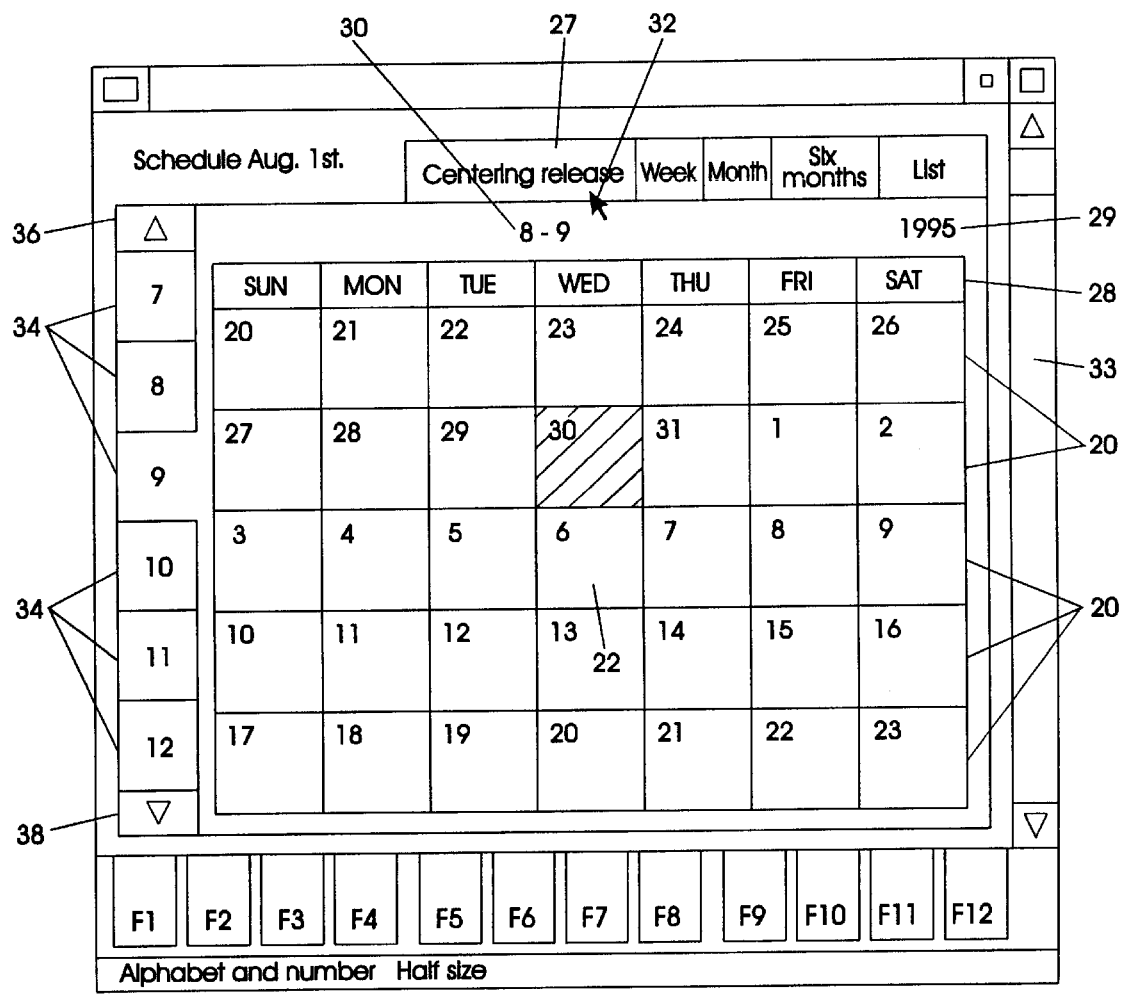
FIG. 11 is a diagram showing calendar changes that are obtained by performing the centering release process of the present invention.

Program control waits until key input occurs. When, at decision block 404, key input is detected, at decision block 406 a check is performed to determine whether or not the input is for centering. Such key input can be performed by selecting the centering icon 25 with the pointer 32, by depressing the "C" key on the keyboard, by depressing a designated PF key, or by selecting the daily display frame of the specific day 22 by double clicking. When the input is not for centering, at process block 408, a process for other key input is performed. When the input is for centering, at process block 410, the centering process, which will be described later, is performed. On the display screen 18, daily frames 20 are added that belong to the final week of August, and five weeks, from which are removed the daily frames 20 that belong to the final week in September, are displayed, as is shown in FIG. 11. In this manner, five-week schedules with a specific day 22 at the center can be displayed. Since the present invention can be achieved by performing the above described procedures, this can be introduced as an additional function for conventional software to display monthly calendars, so that the human efforts for development and manufacturing costs can be reduced.

In the preferred embodiment of the present invention, program control waits again for the occurrence of key input. If, at decision block 412, key input is detected, at decision block 414, a check is performed to determine whether or not the input is for centering release. Such key input, as in the key input for centering, can be performed by selecting the centering release icon 27 with the pointer 32, by depressing the "K" key on the keyboard, by depressing a designated PF key, or by selecting the daily display frame 20 of the specific day 22 by double clicking. When the input is not for centering release, at process block 416 a process for other key input is performed. When the input is for centering release, at process block 402, a common calendar for one month, as is shown in FIG. 10, is again displayed on the display screen 18. According to another mode of the present invention, the previously described zooming process and the centering process can be combined for employment.

Figure 9:
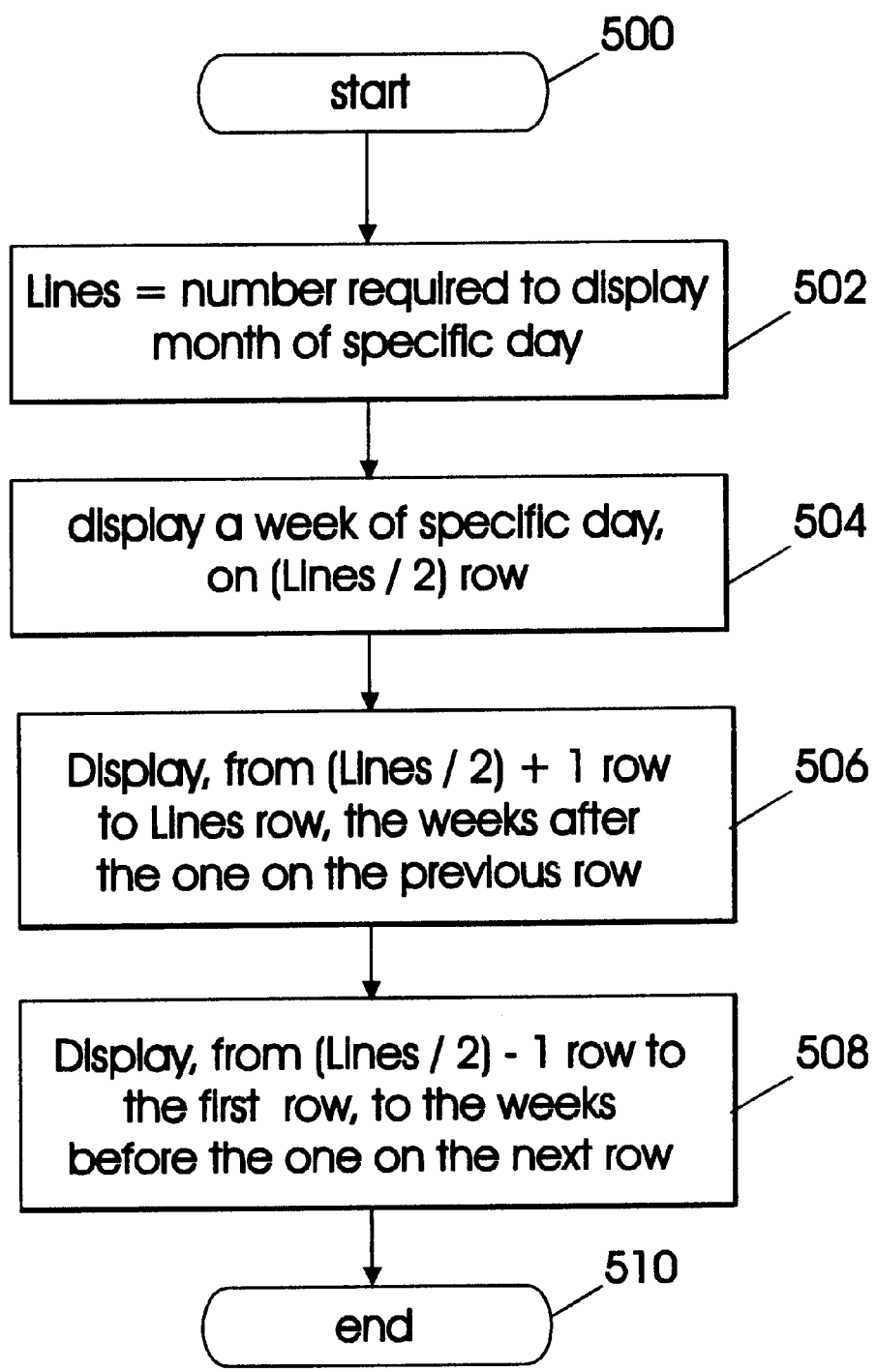
FIG. 9 is a flowchart showing a centering release process according to the preferred embodiment of the present invention.

The procedures for the centering process will now be described while referring to FIG. 11. In FIG. 9, process block 502, "the number of rows required for displaying the month that includes a specific day 22" is set as the number of lines to be displayed. Then, at process block 504, the week that includes a specific day 22 is displayed in the row that corresponds to line count/2. At process block 506, the following weeks of the week on the previous row are displayed from the row that corresponds to (line count to be displayed/2)+1 to the row that corresponds to the line numbers that are to be displayed. At process block 508, the weeks preceding the week on the following row are displayed from the row that corresponds to (line count to be displayed/2)−1 to the first row.

Additional functions of the present invention are a daily display frame enlarging function, a daily display frame adjusting function, and a limited display function. To use the daily display frame enlarge function to enlarge or reduce a daily display frame 20, the pointer 32 is used to engage the external edge of the daily display frame 20 which is then dragged in the same manner as is done to enlarge a multi-window. With this function, data can be displayed that cannot be displayed in a normal size display frame, and a font size that corresponds to a display frame is employed to provide a more easily discernible display. The display frames 20 can be enlarged in any direction, and a plurality of the display frames 20 can be enlarged and reduced at the same time as weeks or as days of a week.

The daily display frame adjusting function adjusts the display area of the daily display frame 20 in consonance with the quantity of data that is displayed in the daily display frame 20. With this function, data can be displayed that cannot be displayed in a normal size display frame, and if there is not too much data to be displayed, many weeks can be displayed at one time. A display frame can be enlarged in any direction, and a plurality of the daily display frames 20 can also be enlarged and reduced as weeks or as days of a week. Further, the minimum display range can be set and can also be altered by a user.

The limited display function enlarges and displays only the daily display frame 20 that is selected by a user. A plurality of daily display frames 20 are designated in the same manner as is used for the selection of a specific day 22, and input (icon selection, a PF key, keyboard input, etc.) is performed to provide a limited display, so that only the designated daily display frames 20, or the weeks or days to which the selected daily display frames 20 belong, can be enlarged and displayed. In addition, a plurality of frames for the days of a week shown in FIG. 6 are selected and only the selected days of the week can be enlarged and displayed. With this function, data can be displayed that cannot be displayed on a normal size display frame, and a font size that corresponds to the size of the display frame is employed to provide a display that can be more easily seen. A user is also permitted to select the daily display frame enlarging function, the daily display frame adjusting function, and the limited display function for employment.

As is described above, according to the present invention, even on an insufficiently large display screen a font size that enables a user to easily identify characters is ensured, and a two-week schedule that extends from an immediately preceding month or into an immediately succeeding month can be displayed at one time. Further, a user designated calendar period can be displayed. Means for operating the functions can be provided that can be easily manipulated, even by a person who is not familiar with computers and electronic notebooks, and with which erroneous operations seldom occur. Since the present invention can be introduced as an additional function for conventional software to display a monthly calendar, the human effort involved in development and manufacturing costs can be reduced.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. A method of displaying a calendar including daily data on a display screen, comprising the steps of:

(a) displaying a calendar for a specific month by arranging days of a week of said specific month in a row on said display screen;

(b) detecting an operation for said specific month; and (c) displaying, in addition to said specific month, at least one additional week with one of said at least one additional week closer to a predetermined day of said specific month on said display screen.

2. The method of claim 1, wherein said step of displaying at least one additional week comprises:

displaying a total of five weeks with a specific week containing a predetermined day being in a middle position with two weeks prior and two weeks subsequent.

3. An apparatus, having an LCD device, an input device, a memory and a CPU in a portable housing case, for displaying a calendar including daily data on a display screen of said LCD device, comprising:

(a) means for displaying a calendar for a specific month by arranging days of a week of said specific month in a row on said display screen;

(b) means for detecting an operation for said specific month; and (c) means for displaying, in addition to said specific month, at least one additional week with one of said at least one additional week closer to a predetermined day of said specific month on said display screen.

4. The apparatus of claim 3, wherein said means for displaying at least one additional week comprises:

means for displaying a total of five weeks with a specific week containing a predetermined day being in a middle position with two weeks prior and two weeks subsequent.

5. A method for displaying a daily calendar on a display screen, comprising the steps of:

(a) displaying a calendar for at least four weeks of a specific month by arranging the days of a week of said specific month in a row on said display screen; and (b) displaying, in response to an operation for display alteration, at least one more week continued to said at least four weeks on said display screen.

6. The method according to claim 5, further comprising:

detecting an operation for releasing an altered display; and when said operation for releasing an altered display is detected, returning to display a calendar that exits before said operation for display alteration is entered.

7. The method according to claim 5, wherein a calendar display area on said screen at said step (a) and a calendar display area at said step (b) are the same size, and wherein the same size display area can be allocated to weeks of a calendar displayed at said step (b).

8. The method according to claim 5, wherein a display area for each daily data on a calendar at said step (b) is changed in consonance with a font size of data that are to be displayed for each day in a calendar displayed at said step (a).

9. The method according to claim 5, wherein a font size for displayed daily data on a calendar at said step (b) is changed in consonance with a display area for each day on a displayed calendar at said step (b).

10. The method according to claim 5, wherein a procedure at said step (b) is repeatedly performed a predetermined number of times.

* * * * *